United States Patent
Taylor et al.

(10) Patent No.: US 11,314,822 B2
(45) Date of Patent: Apr. 26, 2022

(54) INTERFACE FOR A UNIVERSAL SEARCH

(71) Applicant: Google LLC, Mountain View, CA (US)

(72) Inventors: Bret S. Taylor, Palo Alto, CA (US);
Marissa Ann Mayer, Palo Alto, CA (US); Orkut Buyukkokten, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 441 days.

(21) Appl. No.: 16/518,579

(22) Filed: Jul. 22, 2019

(65) Prior Publication Data

US 2019/0347300 A1    Nov. 14, 2019

Related U.S. Application Data

(63) Continuation of application No. 15/130,508, filed on Apr. 15, 2016, now Pat. No. 10,409,865, which is a continuation of application No. 14/725,368, filed on May 29, 2015, now Pat. No. 9,342,563, which is a continuation of application No. 13/616,864, filed on Sep. 14, 2012, now Pat. No. 9,058,389, which is a
(Continued)

(51) Int. Cl.
| | |
|---|---|
| *G06F 16/951* | (2019.01) |
| *G06F 16/35* | (2019.01) |
| *G06F 16/958* | (2019.01) |
| *G06F 16/2457* | (2019.01) |

(52) U.S. Cl.
CPC ...... *G06F 16/951* (2019.01); *G06F 16/24578* (2019.01); *G06F 16/35* (2019.01); *G06F 16/958* (2019.01); *Y10S 707/99933* (2013.01); *Y10S 707/99936* (2013.01); *Y10S 707/99945* (2013.01)

(58) Field of Classification Search
CPC ...... G06F 16/951; G06F 16/958; G06F 16/35; G06F 16/24578; Y10S 707/99933; Y10S 707/99936; Y10S 707/99945
USPC .......................................................... 707/706
See application file for complete search history.

(56) References Cited

U.S. PATENT DOCUMENTS

| | | |
|---|---|---|
| 5,875,446 A | 2/1999 | Brown et al. |
| 5,924,090 A | 7/1999 | Krellenstein et al. |
| | (Continued) | |

FOREIGN PATENT DOCUMENTS

| | | |
|---|---|---|
| WO | 98/12881 | 2/1998 |
| WO | 01/46870 | 6/2001 |

OTHER PUBLICATIONS

Goldberg et al., "Metasearch engines and Information Retrieval: Computational complexity of ranking multiple search results", Queens College, Department of Computer Science, 2008, pp. 315-320.

(Continued)

*Primary Examiner* — Joshua Bullock
(74) *Attorney, Agent, or Firm* — Dority & Manning, P.A.

(57) ABSTRACT

A search engine may perform a search for a user search query over a number of possible search categories. For example, the search query may be performed for general web documents, images, and news documents. The search engine ranks categories based on the search query and/or the documents returned for each category and presents the search results to the user by category. Higher ranking categories may be presented more prominently than lower ranking categories.

20 Claims, 6 Drawing Sheets

Related U.S. Application Data continuation of application No. 12/200,601, filed on Aug. 28, 2008, now Pat. No. 8,301,656, which is a continuation of application No. 10/748,666, filed on Dec. 31, 2003, now Pat. No. 7,447,678.

(56) References Cited

U.S. PATENT DOCUMENTS

| | | | |
|---|---|---|---|
| 5,940,821 | A | 8/1999 | Wical et al. |
| 6,026,388 | A | 2/2000 | Liddy et al. |
| 6,654,749 | B1 | 11/2003 | Nashed |
| 6,785,671 | B1* | 8/2004 | Bailey .............. G06Q 10/02 705/5 |
| 6,842,761 | B2 | 1/2005 | Diamond et al. |
| 6,961,731 | B2 | 11/2005 | Holbrook |
| 6,963,867 | B2 | 11/2005 | Ford et al. |
| 7,206,780 | B2* | 4/2007 | Slackman .......... G06F 16/334 |
| 7,249,058 | B2 | 7/2007 | Kim et al. |
| 7,447,678 | B2 | 11/2008 | Taylor |
| 7,627,826 | B2 | 12/2009 | Pry |
| 7,644,373 | B2 | 1/2010 | Jing et al. |
| 2002/0078045 | A1* | 6/2002 | Dutta ................ G06F 16/951 |
| 2002/0152222 | A1* | 10/2002 | Holbrook .......... G06F 16/338 |
| 2003/0037050 | A1 | 2/2003 | Monteverde |
| 2003/0046161 | A1 | 3/2003 | Kamangar et al. |
| 2003/0164862 | A1* | 9/2003 | Cadiz .............. G06Q 10/107 715/838 |
| 2003/0195877 | A1* | 10/2003 | Ford ................ G06F 16/951 |
| 2004/0003352 | A1* | 1/2004 | Bargeron ......... G06F 16/9535 715/230 |
| 2005/0004889 | A1 | 1/2005 | Bailey et al. |
| 2006/0106793 | A1 | 5/2006 | Liang |
| 2006/0265417 | A1 | 11/2006 | Amato et al. |
| 2007/0174790 | A1 | 7/2007 | Jing et al. |
| 2008/0276185 | A1 | 11/2008 | Pry |
| 2014/0365481 | A1* | 12/2014 | Novosel ............ G06F 16/904 707/728 |

OTHER PUBLICATIONS

AI Publications Co. ltd. IT Information Search Techniques using the Internet, Search Engine.

Decision to Refuse in European Application No. 048143606-1952 dated May 29, 2017, 13 pages.

Extended European Search Report issued in European Application No. 17180613.6, dated Nov. 3, 2017, 10 pages.

Office Action issued in European Application No. 17180613.6, dated Aug. 28, 2018, 8 pages.

* cited by examiner

INTERFACE FOR A UNIVERSAL SEARCH

CROSS-REFERENCE TO RELATED APPLICATIONS

This application is a continuation of U.S. application Ser. No. 15/130,508, filed on Apr. 15, 2016, which is a continuation of U.S. application Ser. No. 14/725,368, filed on May 29, 2015, now U.S. Pat. No. 9,342,563, which is a continuation of U.S. patent application Ser. No. 13/616,864, now U.S. Pat. No. 9,058,389, filed on Sep. 14, 2012, which is a continuation of U.S. patent application Ser. No. 12/200,601, now U.S. Pat. No. 8,301,656, filed on Aug. 28, 2008, which is a continuation of U.S. patent application Ser. No. 10/748,666, now U.S. Pat. No. 7,447,678, filed on Dec. 31, 2003. The entire contents of each of the prior applications is incorporated by reference in its entirety.

BACKGROUND OF THE INVENTION

Field of the Invention

The present invention relates generally to database search engines, and more particularly, to user interfaces that are used to present the results of a search.

Description of the Related Art

The World Wide Web ("web") contains a vast amount of information. Search engines assist users in locating desired portions of this information by cataloging web documents. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

The corpus of pre-stored web documents may be stored by the search engine as an index of terms found in the web pages. Documents in the index may be categorized into one or more categories. Examples of such categories include general web documents, commercial products, images, sponsored advertisements/links, and news documents. Dividing the index into categories can be beneficial in helping users find more relevant results to their search queries. For example, a user interested in finding a digital camera to purchase may be particularly interested in specific models and prices of digital cameras and not as interested in information relating to the taking of digital pictures.

One problem associated with search engines capable of performing multi-category searches is how to present the different category options to users. One known technique is to allow the user to pick the desired category and to then enter a search query. The user may, for example, first select a "news" tab from the search engine's home page and then enter a search query that will be applied to an index of news documents. Although this technique gives users a great deal of control in directing their search queries, a practical problem with this technique is that a large majority of users tend to ignore the category tabs, resulting in their search query being directed to the default category.

Thus, there is a need in the art to assist users in more effectively searching information segmented by category.

SUMMARY OF THE INVENTION

One aspect of the invention is directed to a method that includes performing a search to determine documents related to a search query. The search is performed on a database containing a number of document categories, and obtains a list of search results corresponding to each of at least two of the categories. The method further includes ranking the lists of search results relative to one another and generating a document in which the search results are placed in an organization determined based, at least in part, on the ranking of the lists of search results.

Another aspect of the invention is directed to a search engine that includes a search component configured to determine documents related to a search query. The search is performed on a database containing a number of document categories and obtains a list of search results corresponding to each of at least two of the categories. A ranking component ranks the lists of search results relative to one another and an interface generation component generates a document in which the search results are placed in an organization determined based, at least in part, on the ranking of the lists of search results.

Yet another aspect of the invention is directed to a method of organizing documents categorized into a plurality of categories. The method comprising ranking the plurality of categories based on contents of the documents in each of the categories and generating a results document in which the documents are organized by category and in which the documents of higher ranking categories are more prominently placed in the results document.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

As described herein, a search engine returns search results to a user in which the search results are organized by document category. The different document categories are organized in the document returned to the user based, at least in part, on the relevance of the categories to the user search query.

Exemplary Network Overview

Figure 1:
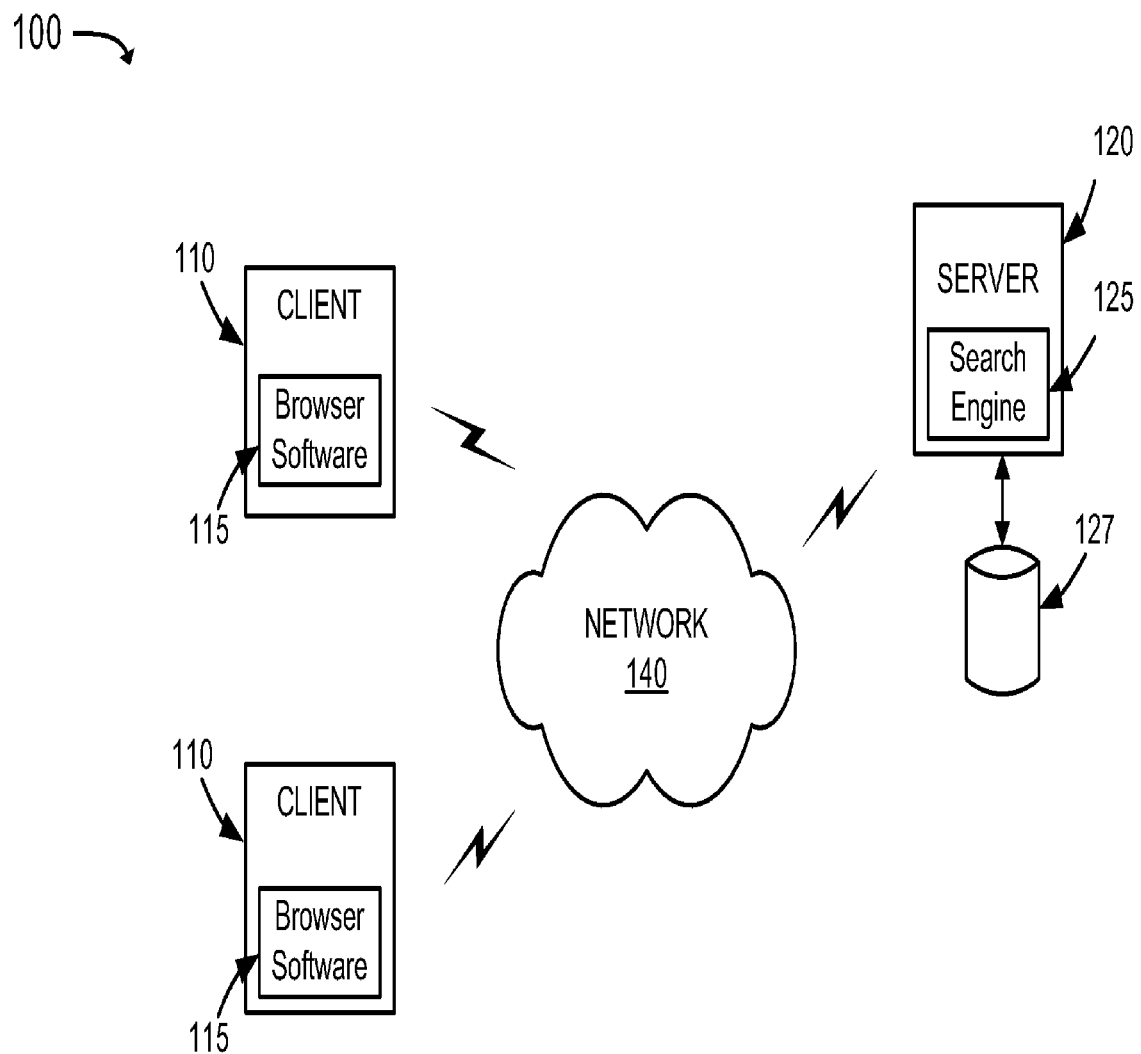
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, and/or optical connections. Also, while server 120 is illustrated as a single entity, in practice, server 120 may be implemented as a number of networked server devices.

Clients 110 may include client software, such as browser software 115. Browser software 115 may include a web browser, such as the existing Microsoft Internet Explorer or Netscape Navigator browsers. For example, when network 140 is the Internet, clients 110 may navigate the web via browsers 115 and, in particular, access server 120 via browsers 115.

Server 120 may operate as a web server and include search engine 125. In one implementation, search engine 125 may function as a query-based web page search engine. In response to client requests, search engine 125 may return sets of documents to clients 110. The documents may be returned to clients 110 as a web page containing a list of links to web pages that are relevant to the search query. This list of links may be ranked and displayed in an order based on the search engine's determination of relevance to the search query.

When performing a search for documents related to a user search query, search engine 125 may search database 127. Database 127 may include a number of documents, such as documents gathered from resources coupled to network 140 (e.g., web documents). The documents in database 127 may be segmented into categories, as will be described in more detail below.

A document, as the term is used herein, is to be broadly interpreted to include any machine-readable and machine-storable work product. A document may be an e-mail, a file, a combination of files, one or more files with embedded links to other files, a news group posting, a web advertisement, or the like. In the context of the Internet, a common document is a web page. Web pages often include textual information and may include embedded information (such as meta information, images, hyperlinks, etc.) and/or embedded instructions (such as Javascript, etc.).

Exemplary Client/Server Architecture

Figure 2:
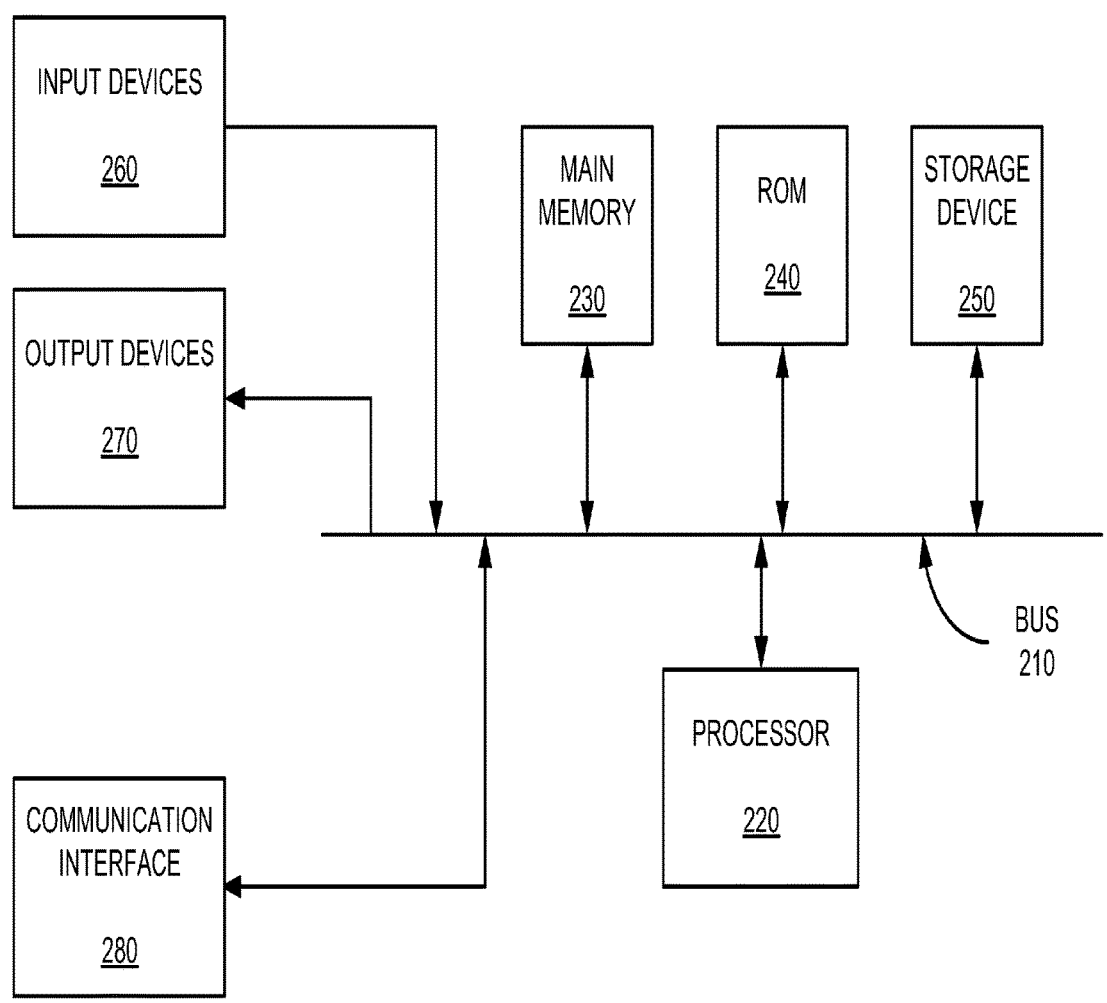
FIG. 2 is an exemplary diagram of a client and/or server shown in FIG. 1.

FIG. 2 is an exemplary diagram of a client 110 and/or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include one or more types of conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, or the like. Output device(s) 270 may include one or more conventional mechanisms that output information to the user, including a display, a printer, a speaker, or the like. Communication interface 280 may include any transceiver-like mechanism that enables client 110/120 to communicate with other devices and/or systems. For example, communication interface 280 may include mechanisms for communicating with another device or system via a network, such as network 140.

The software instructions defining search engine 125 and browser software 115 may be read into memory 230 from another computer-readable medium, such as data storage device 250, or from another device via communication interface 280. The software instructions contained in memory 230 cause processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

As mentioned, server software may implement a search engine 125 that, based on a user query, returns a web page containing a list of links to documents that the search engine considers to be relevant to the search query. The links presented to the user may be from multiple document categories and the different categories may be displayed in different sections of the web page (such as, for example, different visual sections). Consistent with an aspect of the invention, the choice of which links and categories to include may be based on relevance to the user search query.

Search Engine 125

Figure 3:
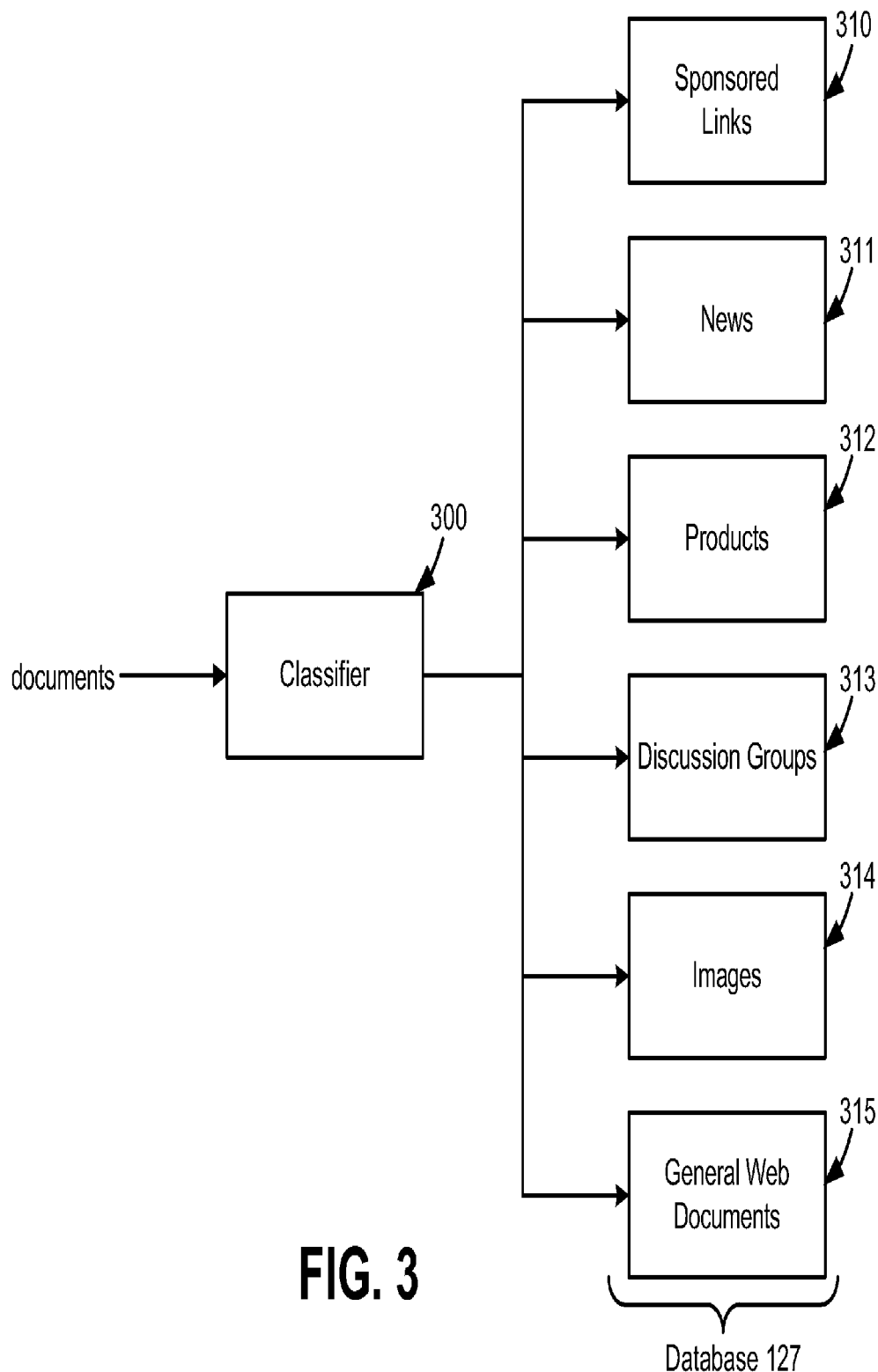
FIG. 3 is a block diagram illustrating the classification of documents into different categories.

As previously mentioned, search engine 125 may operate on an index of documents stored in database 127. The documents in database 127 may include different categories of documents. In some implementations, each different category of documents may be stored as a separate document index. FIG. 3 is a block diagram illustrating classification of documents into different categories. Incoming documents, such as documents crawled from the web or otherwise input to search engine 125, may be input to a classifier 300. Classifier 300 may classify the documents based on their content. Possible classifications include sponsored links, news documents, product documents, documents summarizing discussion groups, images, and general web documents. Other classifications are, of course, possible. A product document may be a web page for a product that is for sale. A discussion group document may be an archive of an on-line discussion group or web pages that include the discussion group. A news document may include documents relating to news items or current events. Sponsored links may include links that a third-party pays the search engine operator to display (e.g., advertisements). In some implementations, a document may be classified as belonging to multiple classifications.

Classifier 300 may be an automated classifier that bases its decisions on, for example, the source of the documents, document content, and/or document structure. Techniques for classifying documents are well known in the art and will not be described further herein.

The classified documents may be stored as separate categories or "genres" within the complete document database 127, illustrated as sponsored links category 310, news category 311, products category 312, discussion groups category 313, images category 314, and general web documents category 315. One of ordinary skill in the art will recognize that more, fewer or different categories could be used. Each category 310-315 may be separately indexed by search engine 125.

Figure 4:
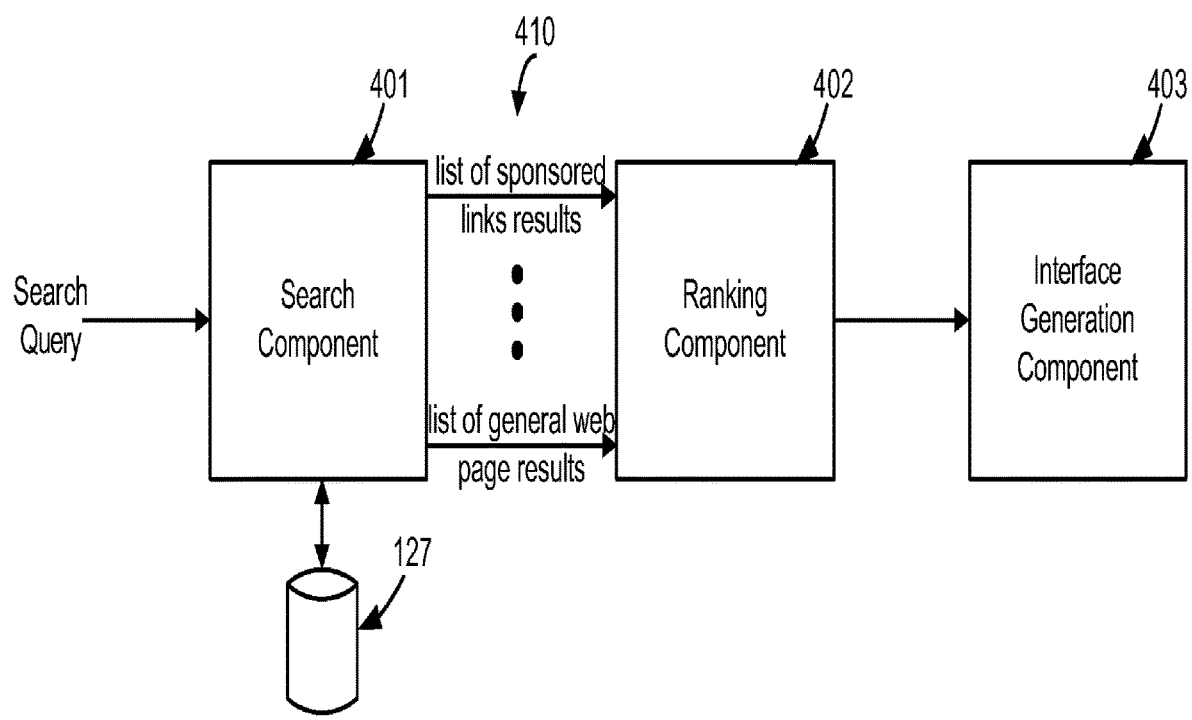
FIG. 4 is a block diagram conceptually illustrating functional components of the search engine shown in FIG. 1.

FIG. 4 is a block diagram conceptually illustrating functional components of search engine 125. Search engine 125 may include a search component 401, a ranking component 402, and an interface generation component 403.

In general, search component 401 may receive user search queries, access database 127 based on the search queries, and obtain lists of links 410 (e.g., URLs) of relevant documents. The lists of links may also include information that generally attempts to describe the content of the web documents associated with the links. Each list in the lists of links may be associated with one of document categories 310-315. Thus, the first list may be of sponsored links that are relevant to the user search query, the second list may be of news articles relevant to the user search query, etc. The lists may be generated, for example, by search component 401 by individually applying the user search query to each document category 310-315.

Within each list of relevant links, the list may be ordered by perceived relevance to the user search query. In general, processes for searching an indexed corpus of documents to return relevant documents are well known in the art. Accordingly, the functionality of search component 401 related to performing a search based on a user query and ranking the results within a list according to perceived relevance will not be described further herein.

The lists of links 410 may be ranked by ranking component 402. Ranking component 402 may analyze the links in lists 410 and/or the documents corresponding to the links and, based on the analysis, determine a relative relevance of the lists. In other words, based on the search results generated from each category 310-315, ranking component 402 may rank the categories by perceived relevance to the user search query. Ranking component 402 may base its ranking on the documents corresponding to the links in each list and/or the user search query. For example, ranking component 402 may generally compare the search query to the contents of the documents in each list and base its ranking values on the closeness of the comparison. Consider the search query "buy athletic shoes." For this search query, ranking component 402 may determine that the user is most likely interested in athletic shoes that are for sale. Accordingly, ranking component may rank the "products" category highly. The links in the list of links that correspond to the products category are likely to be links that correspond to web pages that are offering shoes for sale.

As another implementation of ranking component 402, the ranking component may look for terms in the search query that tend to indicate a particular category is likely to be related. For example, the word "buy" in a search query may indicate the "products" category should be ranked highly.

Interface generation component 403 may generate a document, such as a web page, that contains the results of the search query. The results may be organized on the web page in a manner that generally corresponds to the rankings generated by ranking component 402. Categories that are determined to be more relevant than others by ranking component 402 may be presented more prominently on the web page.

Figure 5:
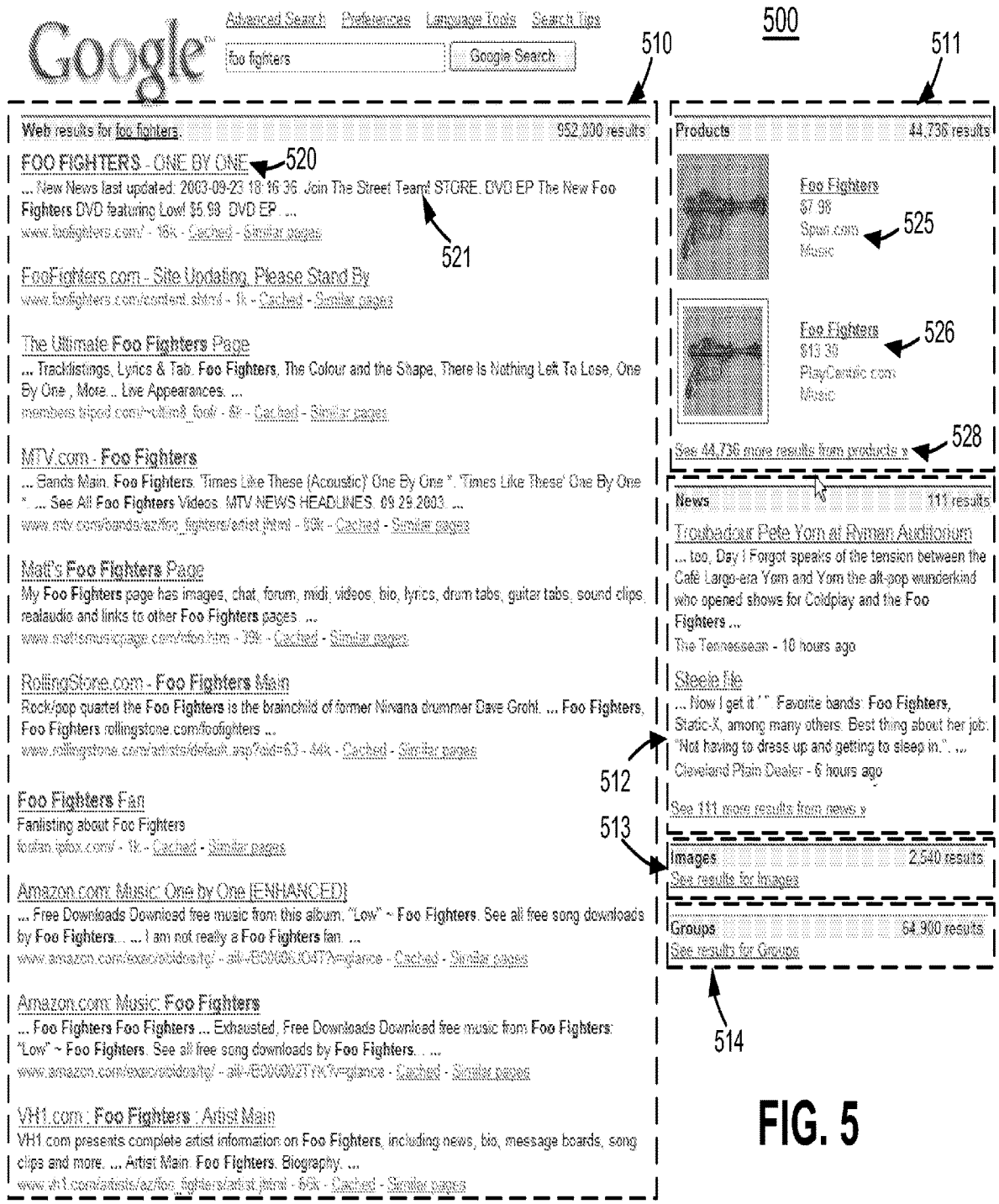
FIG. 5 is a diagram illustrating an exemplary web page that contains search results organized into a number of visual categories.

FIG. 5 is a diagram illustrating an exemplary web page 500 that contains search results organized into a number of categories. The results on web page 500 were returned by search component 401 for the exemplary search "foo fighters." The various sections in web page 500 are demarcated by dashed lines. As illustrated, the largest section, section 510, contains general web page results for the search query "foo fighters." Thus, general web page category 315 may have been selected as the highest ranked category by ranking component 402. In some implementations, because search engine users may expect to receive links derived from a general index of the web, interface generation component 403 may always construct web page 500 with the general web page category 315 as the most prominent category.

Section 510 may contain a number of links (e.g., hypertext transfer protocol links) to relevant documents, such as link 520. Link 520 may additionally include a textual snippet 521 that provides additional information about the document referred to by link 520. Snippet 521 may be derived from the contents of the document.

Products section 511 and news section 512 are also relatively prominently displayed in web page 500. The links in products section 511 and news section 512 may therefore have been determined to be relevant to the user's search query, although potentially not as relevant as the links in general web results section 510. Accordingly, sections 511 and 512 may include fewer links than section 510. In particular, as shown, section 511 includes two links, links 525 and 526. Section 512 may also include two links. The links in products section 511 may be derived from products category 312 and may include information relevant to a user wishing to purchase a product, such as images of the products, prices, and the names of the merchants selling the products. In this case, the search term "foo fighters" is a musical group and the most relevant product links are two links selling one of the group's music albums. Products section 511 also includes a link 528 that indicates that additional product links are available. As shown, link 528 indicates how many other hits were generated in the products category. By selecting link 528, the user may be presented with another web page showing additional links from product category 312.

As shown, news section 512 may be structured similarly to products section 511. News section 512 contains a number of links to news articles from news documents category 311. News section 512 may also include a link indicating additional news items are available.

Other categories, such as image section 513 and groups section 514 may also be displayed in web page 500. These categories may correspond to categories that ranking component 402 determines to be less relevant than the categories corresponding to sections 510, 511, and 512. As shown, no links may be explicitly shown in image section 513 and groups section 514. Instead, sections 513 and 514 may only indicate the number of hits in that category and a link to the results in that category. In this manner, the user is made aware that these categories are available and contain possibly relevant results, but web page 500 is not cluttered with an excessive amount of information.

It can be appreciated that the specific organization of sections 510-514 is exemplary. More particularly, the number, size, and layout of the sections could be changed.

Figure 6:
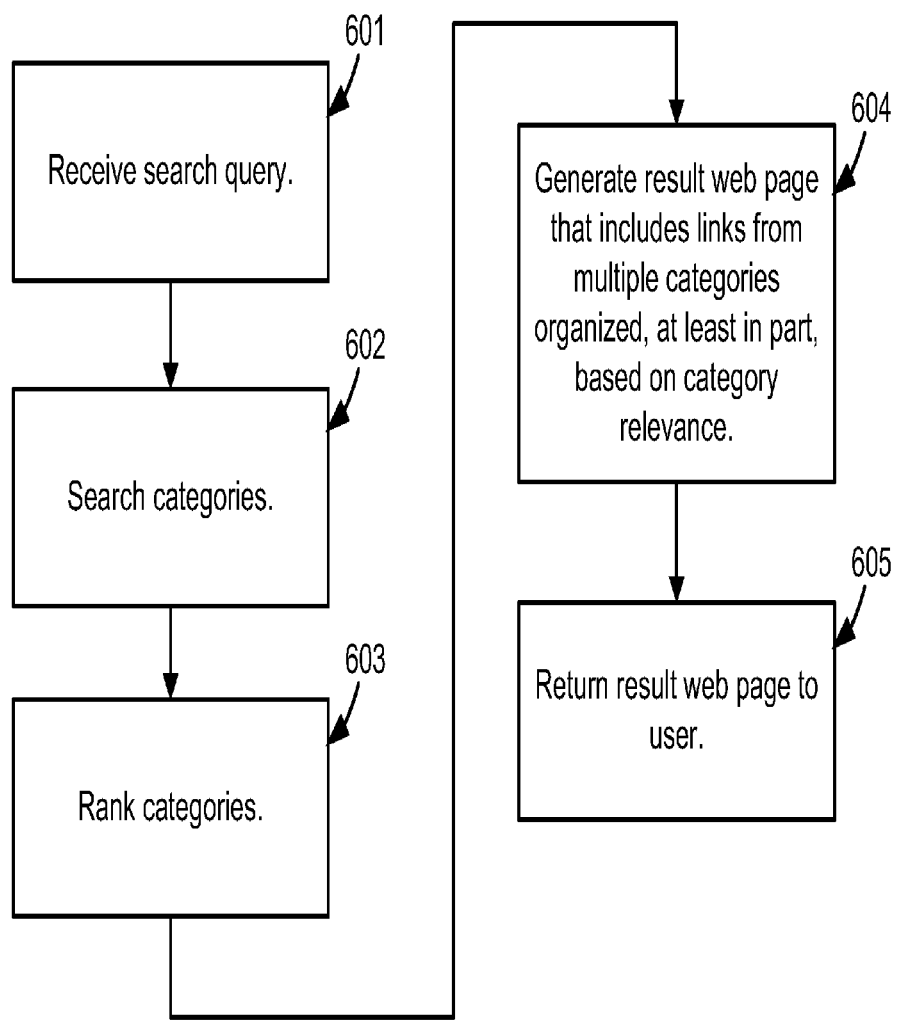
FIG. 6 is a flow chart illustrating operations that may be performed consistent with aspects of the invention.

FIG. 6 is a flow chart illustrating operations that may be performed by search engine 125 consistent with aspects of the invention. Search engine 125 may receive a search query from a user (act 601). Search component 401 may search multiple categories of documents, such as document categories 310-315, based on the search query (act 602). The search may result in, for at least two categories, a list of relevant documents or links to the relevant documents. Ranking component 402 may then rank the various categories based on the results returned from search component 401 (act 603). Interface component 403 may then generate the resultant web page that is to be returned to the user. As illustrated in FIG. 5, above, the web page may include links from multiple categories, organized, at least in part, based on category relevance (act 604). Server 120 may return the generated web page to the user (act 605).

CONCLUSION

By displaying a number of category sections in web page 500, search engine 125, as well as presenting a number of links from a primary category (such as the category that the search engine perceives to be most relevant to the user query), presents links from additional categories. Users may quickly scan links, and if the user realizes that they are more interested in a category other than the main category, the user can select a document from the other category or a link to additional results from the other category. In this manner, the user search experience can be improved without requiring the user to choose a category of interest before sending the search query to the search engine.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A computer-implemented method comprising:
   receiving a search query based on voice recognition of user input submitted through a digital assistant;
   determining a relevance score for each particular category of responses to the search query among multiple different categories of responses to the search query, the relevance score for each category indicating relevance of responses to the search query that correspond to the particular category; and
   providing, in a response to the search query, an output that specifies relevant categories of responses to the search query, including:
      organizing presentation of the output such that the multiple different categories are provided in a specified order according to the relevance scores that indicate relevance of each of the particular categories with respect to the search query; and
      including, in the output for each of two or more of the different categories, search results that are respectively relevant to each of the two or more different categories.

2. The method of claim 1, wherein providing the output that specifies the relevant category of responses comprises providing a search results page that includes the search results that are respectively relevant to each of the two or more different categories.

3. The method of claim 1, wherein determining the relevance score for each particular category of responses to the search query comprises determining the relevance score at least partially based on a comparison of at least one term included in the search query to one or more terms that correspond to each particular category.

4. The method of claim 1, wherein providing the output that specifies the relevant category of responses comprises providing the output through a speaker.

5. The method of claim 1, further comprising identifying each particular category of responses by applying the search query to respective document databases, each respective document database including references to resources that are classified as belonging to a different category of resources among multiple different categories of resources.

6. The method of claim 1, further comprising providing, for each particular category of responses, a link to a search results from the particular category.

7. The method of claim 1, further comprising selecting a number of search results for each particular category based on a relevance of the particular category to the search query.

8. A system comprising:
   a data processing apparatus; and
   a memory device storing instructions that, when executed by the data processing apparatus, cause the data processing apparatus to perform operations comprising:
      receiving a search query based on voice recognition of user input submitted through a digital assistant;
      determining a relevance score for each particular category of responses to the search query among multiple different categories of responses to the search query, the relevance score for each category indicating relevance of responses to the search query that correspond to the particular category; and
      providing, in a response to the search query, an output that specifies relevant categories of responses to the search query, including:

organizing presentation of the output such that the multiple different categories are provided in a specified order according to the relevance scores that indicate relevance of each of the particular categories with respect to the search query; and including, in the output for each of two or more of the different categories, search results that are respectively relevant to each of the two or more different categories.

9. The system of claim 8, wherein providing the output that specifies the relevant category of responses comprises providing a search results page that includes the search results that are respectively relevant to each of the two or more different categories.

10. The system of claim 8, wherein determining the relevance score for each particular category of responses to the search query comprises determining the relevance score at least partially based on a comparison of at least one term included in the search query to one or more terms that correspond to each particular category.

11. The system of claim 8, wherein providing the output that specifies the relevant category of responses comprises providing the output through a speaker.

12. The system of claim 8, wherein the instructions cause the data processing apparatus to perform operations further comprising identifying each particular category of responses by applying the search query to respective document databases, each respective document database including references to resources that are classified as belonging to a different category of resources among multiple different categories of resources.

13. The system of claim 8, wherein the instructions cause the data processing apparatus to perform operations further comprising providing, for each particular category of responses, a link to a search results from the particular category.

14. The system of claim 8, wherein the instructions cause the data processing apparatus to perform operations further comprising selecting a number of search results for each particular category based on a relevance of the particular category to the search query.

15. A non-transitory computer-readable storage device comprising instructions that, when executed by one or more processors, cause the one or more processors to perform operations comprising:

receiving a search query based on voice recognition of user input submitted through a digital assistant;

determining a relevance score for each particular category of responses to the search query among multiple different categories of responses to the search query, the relevance score for each category indicating relevance of responses to the search query that correspond to the particular category; and providing, in a response to the search query, an output that specifies relevant categories of responses to the search query, including:

organizing presentation of the output such that the multiple different categories are provided in a specified order according to the relevance scores that indicate relevance of each of the particular categories with respect to the search query; and including, in the output for each of two or more of the different categories, search results that are respectively relevant to each of the two or more different categories.

16. The non-transitory computer-readable storage device of claim 15, wherein providing the output that specifies the relevant category of responses comprises providing a search results page that includes the search results that are respectively relevant to each of the two or more different categories.

17. The non-transitory computer-readable storage device of claim 15, wherein determining the relevance score for each particular category of responses to the search query comprises determining the relevance score at least partially based on a comparison of at least one term included in the search query to one or more terms that correspond to each particular category.

18. The non-transitory computer-readable storage device of claim 15, wherein providing the output that specifies the relevant category of responses comprises providing the output through a speaker.

19. The non-transitory computer-readable storage device of claim 15, wherein the instructions cause the data processing apparatus to perform operations further comprising identifying each particular category of responses by applying the search query to respective document databases, each respective document database including references to resources that are classified as belonging to a different category of resources among multiple different categories of resources.

20. The non-transitory computer-readable storage device of claim 15, wherein the instructions cause the data processing apparatus to perform operations further comprising providing, for each particular category of responses, a link to a search results from the particular category.

* * * * *